United States Patent
Kazama

[11] Patent Number: 6,028,741
[45] Date of Patent: Feb. 22, 2000

[54] MAGNETIC HEAD DEVICE WHICH IS CAPABLE OF CONTROLLING A SHIFT OF A HEAD MAIN BODY

[75] Inventor: Toshio Kazama, Niigata-ken, Japan

[73] Assignee: Alps Electric Co., Ltd., Tokyo, Japan

[21] Appl. No.: 09/090,022

[22] Filed: Jun. 10, 1998

[30] Foreign Application Priority Data

Jun. 16, 1997 [JP] Japan .................................. 9-158241

[51] Int. Cl.[7] ....................................................... G11B 5/48
[52] U.S. Cl. ............................................................. 360/104
[58] Field of Search .............................................. 360/104

[56] References Cited

U.S. PATENT DOCUMENTS 4,724,500  2/1988  Dalziel .

Primary Examiner—A. J. Heinz
Attorney, Agent, or Firm—Brinks Hofer Gilson & Lione

[57] ABSTRACT

A flexure (2) has hook-shaped restricting pieces (18, 18), while a load beam (3) opposed to the restricting pieces (18, 18) is provided with an insert piece (11). When the flexure (2) and the load beam (3) are secured, the insert piece (11) of the load beam (3) is inserted in the restricting pieces (18, 18), so that the vertical shift of the flexure (2) is limited to within the height (H) of the restricting pieces (18). Hence, even if the magnetic head device is subjected to a strong impact, the flexure (2) does not shift in excess of the height (H), thus permitting improved shock resistance of the flexure (2).

8 Claims, 4 Drawing Sheets

MAGNETIC HEAD DEVICE WHICH IS CAPABLE OF CONTROLLING A SHIFT OF A HEAD MAIN BODY

BACKGROUND OF THE INVENTION

1. Field of the Invention

The present invention relates to a flying magnetic head device mounted on a magneto-optical disk apparatus or the like and, more particularly, to a magnetic head device which provides improved shock resistance.

2. Description of the Related Art

FIG. 5 is a partial perspective view illustrating a conventional magnetic head device employed for a magneto-optical disk apparatus.

The magnetic head device is composed of a head main body 25, a flexure 50, and a support member 40.

The head main body 25 has a slider 26 opposed to a record medium, a core assembly 27 being retained by the slider 26; in FIG. 5, the bottom surface is the surface opposed to the record medium, while the upper surface is the surface supported by the support member 40.

The core assembly 27 is composed primarily of a core and a coil 30 wound around the core, a magnetic gap (not shown) of the core assembly 27 appears at the bottom surface of the slider 26.

The flexure 50 is formed using a thin flat spring; it is provided with a fixed portion 51 and a tongue portion 52.

The fixed portion 51 has a positioning hole 54. Projecting portions 55 and 55 are formed on both sides of the fixed portion 51; the projecting portions 55 and 55 are inserted in grooves 28 and 28 of the slider 26, and the tongue portion 52 of the flexure 50 and the slider 26 are secured by bonding or other similar means.

The top surface of the tongue portion 52 of the flexure 50 is held against a pivot 46 (butting portion) formed on an adapter 43 which will be discussed later, and the slider 26 is free to change the position thereof, using the apex of the pivot 46 as the supporting point thereof.

The support member 40 is constituted by a load beam 41 and the adapter 43. The load beam 41 is made of a flat spring material; it has bent portions 41a and 41a which are formed on both edges thereof and which extend from the middle toward the distal end thereof; these portions are rigid, and a predetermined elastic pressing force at the proximal end of the load beam 41. The load beam 41 further has a pair of positioning holes 42 and 42.

The adapter 43 has a concave shape; it has positioning holes 44a and 45a formed in lugs 44 and 45 thereof. With the positioning holes 44a and 45a aligned to the positioning holes 42 and 42 of the load beam 41, the adapter 43 is welded to the load beam 41. The adapter 43 has a stepped section on the bottom surface thereof; the pivot 46 is formed on the higher bottom surface, the pivot jutting out downward spherically. Formed in the lower bottom surface of the adapter 43 is a positioning hole 48; with the positioning hole 48 aligned with the positioning hole 54 of the flexure 50, the fixed portion 51 of the flexure 50 and the adapter 43 are secured in a predetermined area A by welding, bonding, or the like.

In general, the magneto-optical disk is housed in a cartridge to protect the surface of the disk. When the cartridge is placed in the apparatus, the shutter provided on the cartridge is released to open the window portion of the cartridge, so that the head main body 25 shown in FIG. 5 moves into the cartridge through the window portion and the head main body 25 comes in contact with the top surface of the disk. As the disk in the cartridge turns, the airflow on the top surface of the disk causes the head main body 25 to float and the magnetic gap appearing at the bottom surface of the slider 26 in turn causes a perpendicular magnetic field to be applied to the disk. A laser beam is radiated from the opposite side of the disk to record information by light modulation or magnetic field modulation.

In recent years, the head main body 25 has been made smaller, and this has called for the need to reduce the rigidity of the flexure 50. If the flexure 50 retains high rigidity while the head main body 25 has been made smaller, then it would be difficult for the head main body 25 to freely rock, using the pivot 46 formed on the adapter 43 as the supporting point. This leads to a problem, for example, in that the head main body 25 can no longer accurately follow the vertical movement of the record medium or pits and projections on the top surface of the record medium.

To reduce the rigidity of the flexure 50, it is necessary to reduce the thickness of the flexure 50. Reducing the rigidity of the flexure 50, however, poses the following problem. As shown in FIG. 5, the top surface of the flexure 50 is fixed to the adapter 43 by the predetermined area A, while the other end is a free end. Hence, if the rigidity of the flexure 50 is reduced, then the free end of the flexure 50 may be shaken and elastically deformed if the magnetic head device is subjected to a strong impact during the assembly process or the like or if the head main body 25 is subjected to an external force. Further, with the magnetic head device installed on a magneto-optical disk apparatus, if an impact is applied to the entire apparatus, then the head main body 25 may shake severely and may hit the magneto-optical disk, damaging the disk, or the head main body 25 may hit other adjacent components and damage the head main body 25 when the head main body 25 withdraws.

SUMMARY OF THE INVENTION

The present invention has been made with a view toward solving the problem with the prior art described above and it is an object thereof to provide a magnetic head device which is capable of controlling the shift of a head main body to a predetermined range even if a strong impact or external force is applied thereto so as to prevent a flexure from being deformed.

To this end, according to the present invention, there is provided a magnetic head device having a support member, a flexure supported by the support member, and a head main body secured to the flexure, wherein the head main body supported by the flexure is free to swing with a butting portion provided between itself and the support member as the supporting point of the swing, and a restricting portion for restricting the swing of the head main body, with the butting portion serving as the supporting point of the swing, to a predetermined range is provided between the flexure and the support member.

In the magnetic head device in accordance with the present invention, when the flexure and the head main body secured thereto swing, with the butting portion such as a pivot serving as the supporting point, due to the elastic deformation of the flexure, the swinging range thereof is restricted. Therefore, even if a high impact is accidentally applied or an external force is accidentally applied to the head main body, the deforming range of the flexure is accordingly restricted, thus preventing the flexure from developing plastic deformation. Moreover, even if an external impact is applied to the head main body which has been installed on a disk apparatus, the head main body can be prevented from swinging greatly, thus protecting a disk or the head main body from damage.

Preferably, the restricting portions are provided on both sides of the butting portion.

The head main body supported by the flexure swings by using the butting portion shaped like a pivot, a bent piece, or the like as the fulcrum thereof. Providing the restricting portions on both sides of the butting portion serving as the fulcrum makes it possible to prevent the head main body from swinging severely. The restricting portion may alternatively be provided only on one side.

The restricting portion may be composed of a hook-shaped restricting piece, which juts out from the flexure toward the support member and which has a recessed portion, and an insert piece which is provided on the support member and which is allowed to move within a predetermined area in the recessed portion of the restricting piece; or the restricting portion may be composed of a hook-shaped restricting piece, which juts out from the support member toward the flexure, and an insert piece which is provided on the flexure and which is allowed to move in the predetermined area in the recessed portion of the restricting piece.

Preferably, the hook-shaped restricting pieces are formed by bending as integral parts of the flexure or the support member. Alternatively, however, the restricting pieces may be separate components and may be secured to the flexure or the support member.

Further preferably, the swing range of the head main body defined by the restricting portions is not less than the range wherein the head main body swings by using the butting portion as the fulcrum on a moving record medium.

The constitution described above prevents the restricting portions from interfering with the head main body which follows the pits and projections of the record medium when the record medium moves.

The support member of the present invention may be composed of only the load beam or it may be constituted by the load beam and the adapter as shown in FIG. 5.

The magnetic head device in accordance with the present invention can be applied also to a hard disk as well as a magneto-optical disk.

DESCRIPTION OF THE PREFERRED EBODIMENTS

Figure 1:
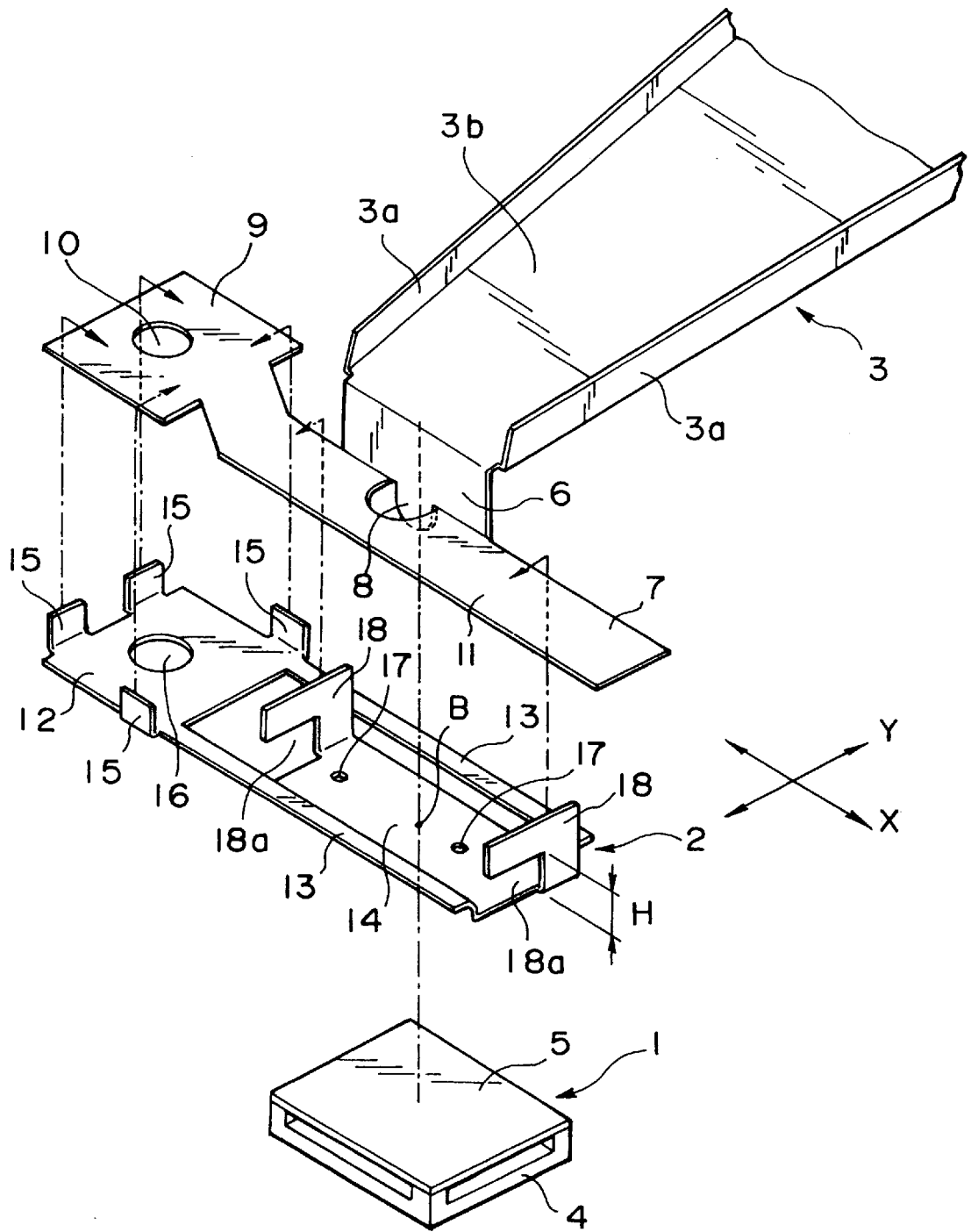
FIG. 1 is a partial assembly view of a flying magnetic head device to be installed on a magneto-optical disk apparatus given as a first embodiment of the present invention.
Figure 2:
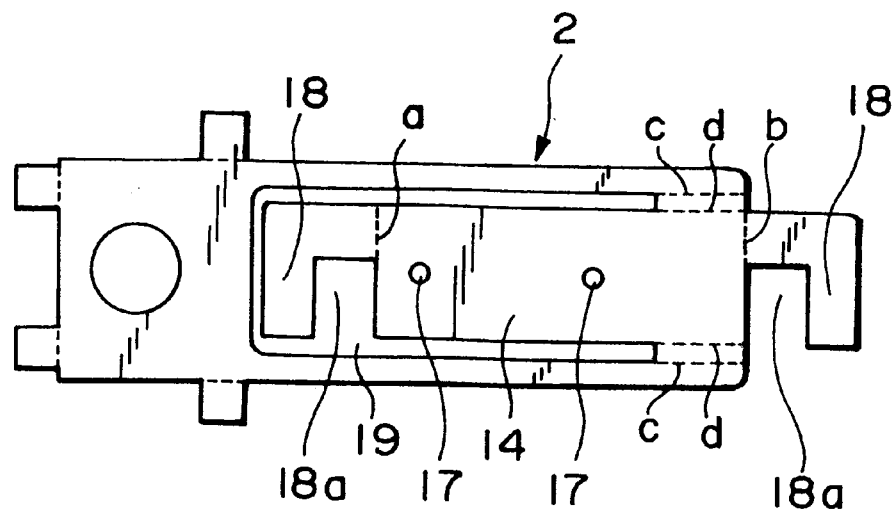
FIG. 2 is a development elevation of a flexure.
Figure 3:
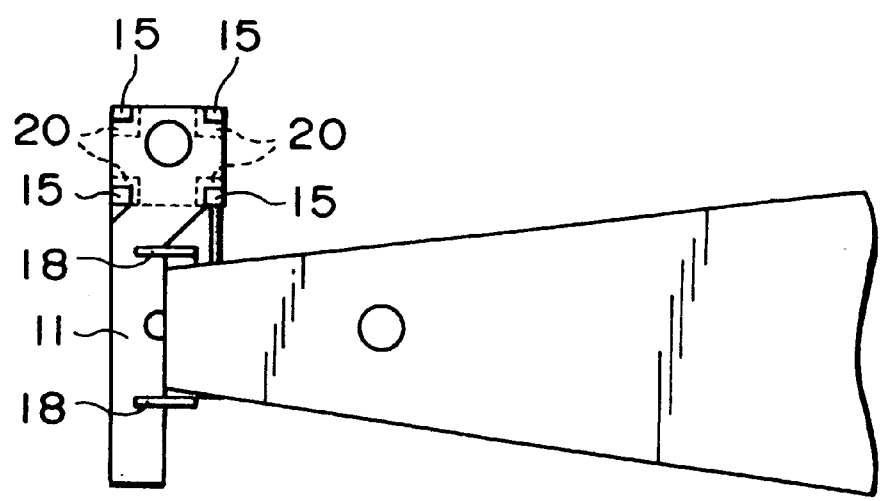
FIG. 3 is a partial top plan view showing the magnetic head device which has been assembled.

FIG. 1 is a partial assembly view of a flying magnetic head device to be mounted on a magneto-optical disk apparatus given as a first embodiment of the present invention; FIG. 2 is a development elevation of a flexure shown in FIG. 1; and FIG. 3 is a partial top plan view showing the magnetic head device which has been assembled.

The magnetic head device is constructed by a head main body 1, a flexure 2, and a load beam, i.e. the support member 3.

The head main body 1 is composed of a slider 4, a core assembly (not shown), and a back plate 5. The slider 4 is formed using a nonmagnetic ceramic material such as calcium titanate ($TiCaO_3$); the surface at the bottom in FIG. 1 is the surface opposed to the record medium, while the surface at the top in the drawing is secured and supported by the flexure 2.

The core assembly is constructed by a front core and a side core wrapped with coils, the cores being made of a magnetic material such as a manganese zinc (Mn-Zn) ferrite and it is shaped into a rectangular parallelepiped.

The cores are fitted or bonded in a groove (not shown) formed at the center of the slider 4 to secure them. The bottom surfaces of the cores are flush with the surface of the slider 4 which is opposed to the record medium, providing a magnetic gap between the front core and the side core.

The back plate 5 shown in FIG. 1 functions as a back core; it is made of a magnetic material such as manganese zinc (Mn-Zn) ferrite just like the foregoing front core and the side core, but it is formed into a plate shape. It is preferable that the bottom surface of the back plate 5 is provided with an electrical insulating layer formed using a nonmagnetic material such as glass ($SiO_2$) to restrain eddy current loss.

When recording current is applied to the coil of the front core, a recording magnetic field is induced from the coil to the front core. The leakage magnetic field between the front core and the side core causes a perpendicular magnetic field to be applied to the record medium via the magnetic gap. The energy of a laser beam is applied from below the record medium so as to record a signal on the record medium by magnetic field modulation or light modulation.

The load beam 3 will now be described.

The load beam 3 is composed of a flat spring; the distal end of the load beam 3 has a stepped portion as illustrated in FIG. 1.

The load beam 3 has bent portions 3a and 3a on both sides thereof from top right to the vicinity of the distal end thereof as shown in FIG. 1; they are rigid portions. From the ends to the proximal end of the bent portions 3a and 3a, a low-rigidity flat spring portion (not shown) which does not have the bent portions 3a and 3a is provided. A flat portion 3b located between the bent portions 3a and 3a is tapered toward the distal end of the load beam 3 as shown in FIG. 1.

A vertically bent surface 6 extends downward from the front edge of the flat portion 3b and perpendicularly to the record medium; and a parallel bent surface 7 extends from the edge of the vertically bent surface 6 so that it is parallel to the record medium and away from the flat portion 3b.

As illustrated, a plate-shaped pivot, i.e. butting portion, 8 juts out at the center of the bottom surface of the vertically bent surface 6 perpendicularly in relation to the record medium in such a manner that it is an integral part of the vertically bent surface 6.

The pivot 8 is held against the top surface of the head main body 1 via the flexure 2 to support the head main body 1 so that the head main body 1 can swing.

Figure 5:
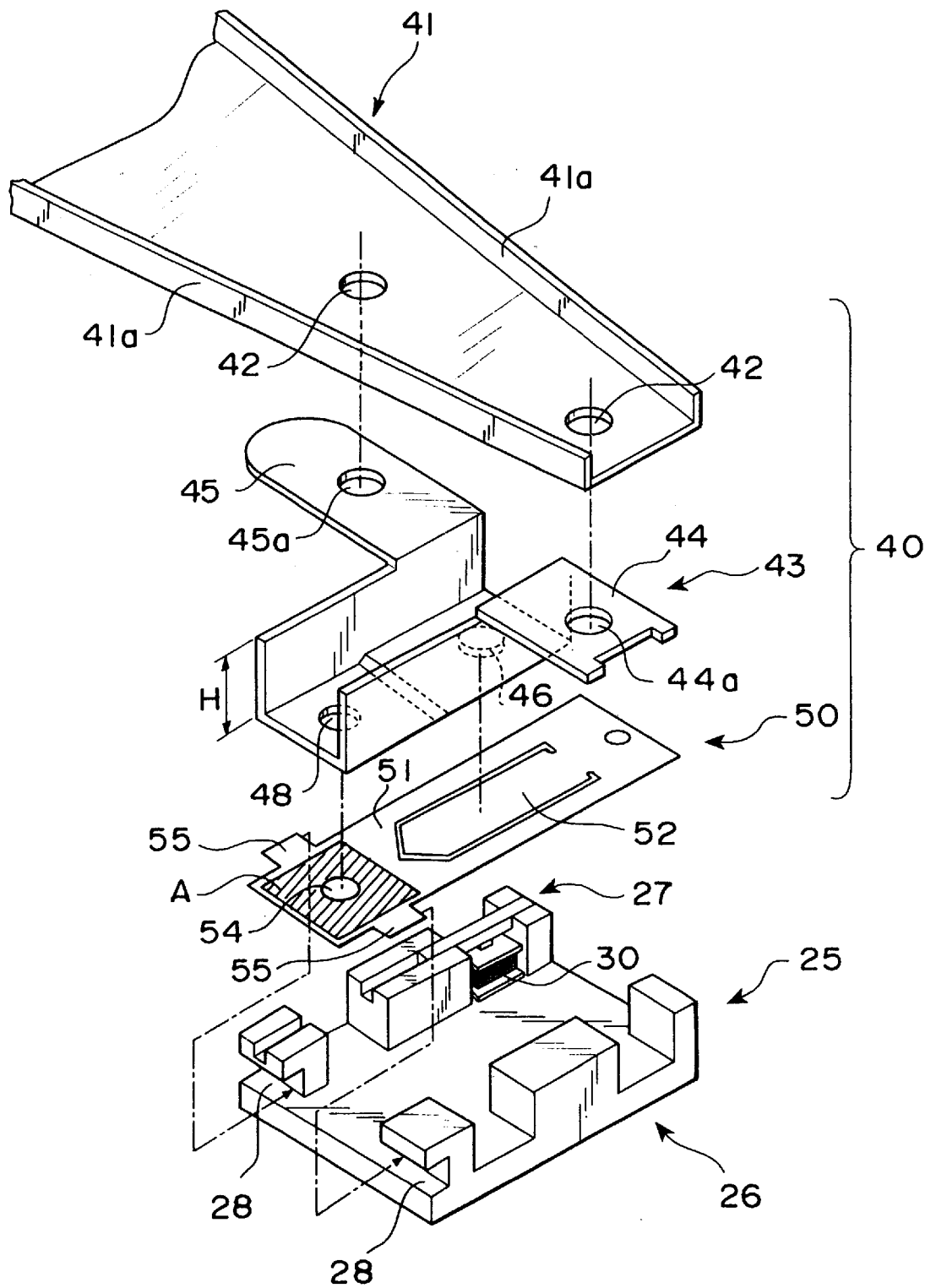
FIG. 5 is a partial assembly view of a conventional flying magnetic head device to be installed on a magneto-optical disk apparatus.

In the present invention, the pivot 8 is formed integrally with the vertically bent surface 6 so that the pivot 8 can be formed in a plate shape. This pivot, therefore, can be brought in contact with the head main body 1 in a state infinitely close to a point contact as compared with the pivot 46 formed by drawing performed by a press as shown in FIG. 5.

Preferably, the pivot 8 is shaped such that the top thereof is round or V-shaped as shown in FIG. 1 to minimize the area of the contact between the pivot 8 and the flexure 2 thereby to support the head main body 1 in such a manner that it is allowed to swing more freely.

As illustrated in FIG. 1, the parallel bent surface 7 extends widthwise, i.e. in the X direction, beyond the width of the vertically bent surface 6. The edge of the parallel bent surface 7 extending to the left in the drawing provides a mounting surface 9. A positioning hole 10 is formed in this mounting surface 9. The mounting surface 9 is the portion to be joined to the flexure 2.

The parallel bent surface 7 excluding the mounting surface 9 provides the insert piece 11; as it will be discussed later, the insert piece 11 is inserted in the recessed portion 18a and 18a of the restricting pieces 18 and 18 provided on the flexure 2 when the load beam 3 is secured to the flexure 2.

The load beam 3 described in detail above is formed from a plate. The plate-shaped load beam 3 is bent to have the stepped section at the tip thereof as shown in FIG. 1. At this time, according to the invention, the height of the vertically bent surface 6 is set to approximately the same height as that of the adapter 43 shown in FIG. 5 beforehand, so that the height from the head main body 1 to the load beam 3 can be set to a predetermined height without the need for providing the adapter 43 as in the prior art.

The flexure 2 is composed of a thin flat spring. As shown in FIG. 1, a fixing surface 12 and arms 13 and 13, which can be elastically deformed, are integrally connected to the flexure 2. Extending from the arms 13 and 13, a head mounting surface 14 is formed via the stepped sections on the opposite side from the fixing surface 12.

Formed on the fixing surface 12 are fixing hooks 15, 15, 15, and 15 which are bent upward in the drawing as integral parts of the fixing surface 12. Further a positioning hole 16 is formed in the fixing surface 12; the positioning hole 16 is provided for alignment with the positioning hole 10 of the load beam 3.

The head mounting surface 14 has positioning holes 17 and 17 for alignment with the head main body 1.

The head mounting surface 14 is further provided with hook-shaped restricting pieces 18 and 18 formed integrally with the head mounting surface 14 on both ends thereof. As shown in FIG. 1, the restricting pieces 18 extend upward in the drawing, the recessed portions 18a and 18a thereof having a height H.

As shown in FIG. 2, the flexure 2 is formed from a plate. The flexure 2 has a slot or cutout 19 formed by etching; the portions separated by the slot 19 provide the head mounting surface 14 and the restricting pieces 18. The restricting pieces are bent upward at dashed lines a and b shown in the drawing so as to orient the restricting pieces 18 and 18 vertically. Further, the flexure is bent downward at dashed lines c shown in FIG. 2 while it is bent upward at dashed lines d to form it into the shape as shown in FIG. 1.

To secure the flexure 2 to the load beam 3, the positioning hole 10 of the mounting surface 9 of the load beam 3 is aligned with the positioning hole 16 of the fixing surface 12 of the flexure 2, and the insert piece 11 of the load beam 3 is inserted between the recessed portions 18a and 18a of the restricting pieces 18 and 18 formed in the head mounting surface 14 of the flexure 2 and the head mounting surface 14, i.e. it is inserted in the gap represented by the height H.

At point B on the top of the head mounting surface 14, the apex of the pivot 8 formed on the load beam 3 comes in contact; in FIG. 1, the restricting pieces 18 and 18 are formed on both ends with point B being the central point therebetween. More specifically, when the insert piece 11 of the load beam 3 is inserted between the recessed portions 18a and 18a of the restricting pieces 18 and 18 of the flexure 2 and the head mounting surface 14 as indicated by the solid line in FIG. 1, the recessed portions 18a and 18a of the restricting pieces 18 and 18 are engaged with the insert piece 11, which extends in both directions from the pivot 8, with a vertical allowance. Thus, the restricting portion composed of the restricting piece 18 and the insert piece 11 is formed such that it extends on both sides from the pivot 8 in FIG. 1.

The mounting surface 9 of the load beam 3 is fitted to the fixing hooks 15, 15, 15 and 15 formed on the fixing surface 12 of the flexure 2, then the fixing hooks 15 are all bent to hold the mounting surface 9. Further, as shown in FIG. 3, a resin or adhesive agent 20 is applied onto and around the bent fixing hooks 15 to secure them by bonding.

The head main body 1 is positioned by the positioning holes 17 and 17 formed in the head mounting surface 14 of the flexure 2 before it is secured to the bottom of the head mounting surface 14 by bonding.

The apex of the pivot 8 formed on the load beam 3 abuts against the top surface of the head main body 1 via the head mounting surface 14 of the flexure 2; hence, the head main body 1 is supported so that it is free to swing with the apex of the pivot 8 serving as the fulcrum.

The vertical shift of the flexure 2 is limited to the range of the height H of the recessed portions 18a and 18a of the restricting pieces 18 and 18 by inserting the insert piece 11, which has been formed on the load beam 3, under the restricting pieces 18 and 18 formed on the flexure 2.

According to the present invention, the range, namely the range defined by H, in which the insert piece 11 is allowed to move at the restricting portion, is set larger than the range in which the head main body 1 swings on a disk so as to allow the head main body 1 to swing on the disk when the record medium, namely, a disk, moves.

Figure 4:
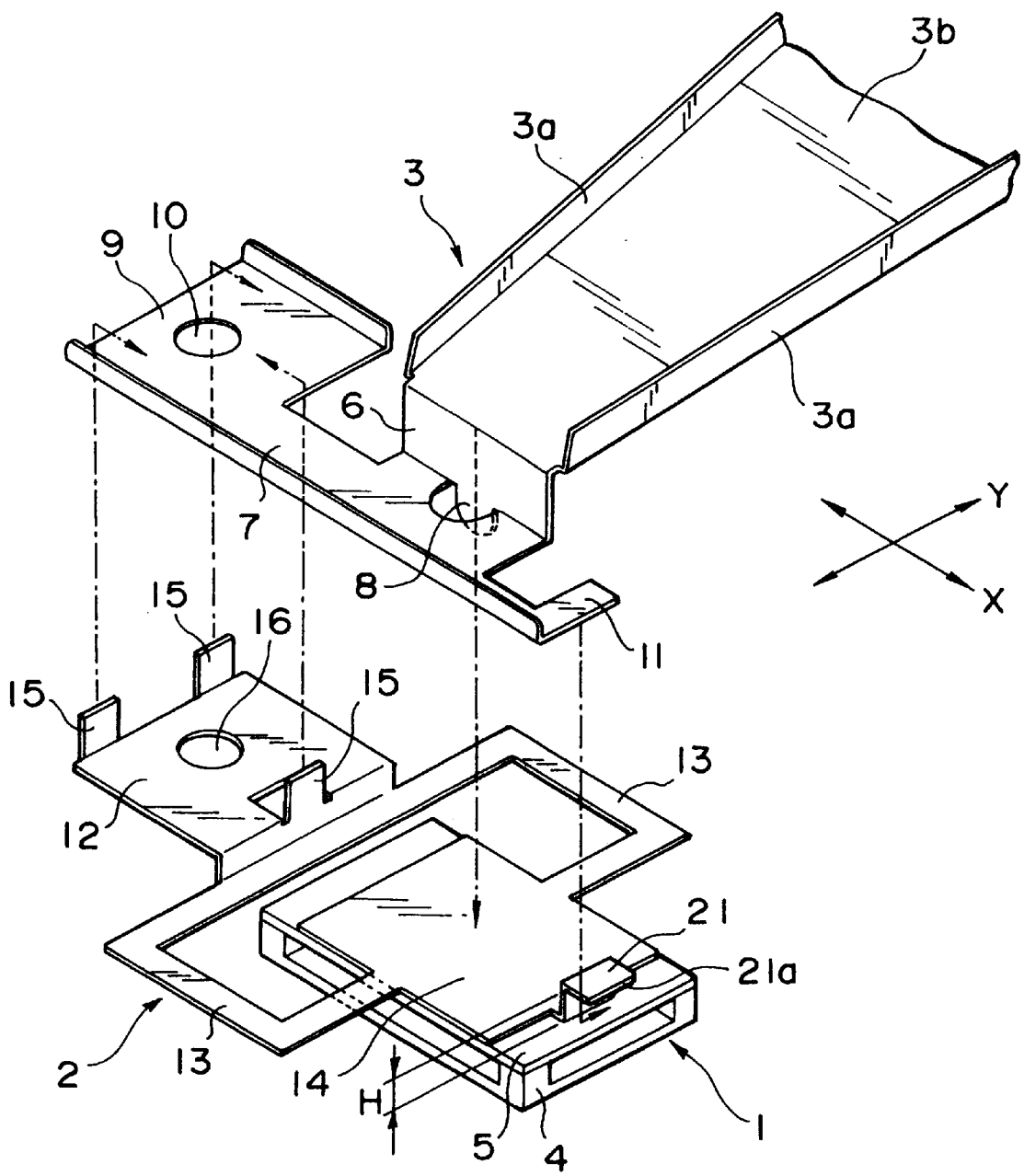
FIG. 4 is a partial assembly view of the flying magnetic head device to be installed on a magneto-optical disk apparatus given as a second embodiment of the present invention.

FIG. 4 is a partial assembly view illustrative of a magnetic head device representing a second embodiment of the present invention.

A load beam 3 in this embodiment has a stepped portion at the distal end thereof as in the case of the load beam 3 shown in FIG. 1, thus obviating the need for the adapter 43 in the prior art as shown in FIG. 5.

As shown in FIG. 4, an insert piece or projecting piece 11 which juts out toward the rear end of the load beam 3 is provided at the right of a parallel bent surface 7 of the load beam 3.

As in the case of the flexure 2 shown in FIG. 1, the flexure 2 of the second embodiment is also composed of a fixing surface 12 and a head mounting surface 14, and the fixing surface 12 and the head mounting surface 14 are joined through arms 13 and 13 which elastically deform.

As shown in FIG. 4, a restricting piece 21 is formed on the right edge of a head mounting surface 14 in the drawing; the restricting piece 21 is shaped like a hook. A recessed portion 21a of the restricting piece 21 has a height H. The height H is set larger than the range in which the head main body 1 swings on the disk.

When the flexure 2 has been secured to the mounting surface 9 of the load beam 3, the inert piece 11 of the load beam 3 is inserted between the recessed portion 21a of the restricting piece 21 and the head main body 1, i.e. it is inserted in the gap corresponding to the height H.

As described in detail above, according to the present invention, the fixing surface 12 of the flexure 2 is secured to the mounting surface 9 of the load beam 3, and the restricting pieces 18 (or the restricting piece 21 in FIG. 4) are formed on the edge of the head mounting surface 14, which edge used to be a free end in the prior art. Furthermore, the insert piece 11 is formed on the load beam 3 at the position opposed to the restricting pieces 18 or the restricting piece 21; the insert piece 11 is set in the restricting pieces 18 or the restricting piece 21.

Thus, the vertical shift of the flexure 2 is limited by the height H of restricting pieces 18 or the restricting piece 21.

Accordingly, the flexure 2 does not shift beyond the height H of the restricting pieces or piece if it is subjected to a strong impact or external force even when the rigidity of the flexure 2 has been decreased by, for example, making the flexure 2 thinner or making the arms 13 and 13 joining the fixing surface 12 and the head mounting surface 14 longer or by making the arms 13 and 13 narrower in order to achieve a smaller size of the head main body 1. Therefore, the flexure 2 no longer deforms from impact, and the stable floating position of the head main body 1 can be maintained at all times.

The shape and the forming position of the restricting portion composed of the restricting piece(s) or and the insert piece(s) in the present invention are not limited to those shown in FIG. 1 and FIG. 4. For instance, the hook-shaped restricting pieces 18 or the restricting piece 21 shown in both FIG. 1 and FIG. 4 extend from the flexure 2 toward the load beam 3; alternatively, however, the restricting pieces 18 or the restricting piece 21 may be formed to extend from the load beam 3 toward the flexure 2 and the flexure 2 may be provided with the insert piece 11, which is formed on the load beam 3 in FIG. 1 and FIG. 4, so that the insert piece 11 may be installed on the restricting pieces 18 or the restricting piece 21.

Likewise, the restricting pieces 18 or the restricting piece 21 is formed on the edges or the edge of the head mounting surface 14 of the flexure 2 as shown in FIG. 1 and FIG. 4; alternatively, however, a cutout may be formed in the head mounting surface 14 and the portions separated by the cutout may be bent to form the restricting pieces 18 or the restricting piece 21.

In the embodiment illustrated in FIG. 1, the restricting portions are formed on both sides of the pivot 8 provided on the load beam 3, while the restricting portion is formed on one side of the pivot 8 in the embodiment shown in FIG. 2. It is desirable to provide the restricting portions on both sides of the pivot 8 to further improve the shock resistance.

The restricting portion formed on only one side of the pivot 8 as shown in FIG. 4 may incur the following disadvantage: if a severe impact is applied to the apparatus, a rotational moment may be generated in the direction in which the impact was applied, with the restricting portion functioning as the fulcrum, thus causing the arms 13 and 13 of the flexure 2 to deform.

Further, in this invention, the description has been given to the magnetic head device constituted by the head main body 1, the flexure 2, and the load beam 3 as shown in FIG. 1 and FIG. 4; the invention, however, is not limited to such a magnetic head device, and it may be also applicable to a magnetic head device which employs the adapter 43 shown in FIG. 5. In this case, the restricting portion will be provided between the flexure 50 and the adapter 43.

Furthermore, in the present invention, the description has been given to the "orthogonal type magnetic head device" in which the head main body 1 is supported at the distal end of the load beam 3 so that it is free to swing, and the load beam 3 is oriented in the direction of the width of the tracks on a record medium when recording or reproducing data. The constitution of the present invention, however, is also applicable to an "inline type magnetic head device" in which the load beam 3 is oriented in such a direction that it intersects with the track width to record or reproduce data.

In the orthogonal type magnetic head device, as shown in FIG. 1, for example, the flexure 2 is oriented so that it is orthogonalized with the length of the load beam 3, whereas the flexure is oriented in the same direction as the length of the load beam in the inline type magnetic head device.

Hence, in order to apply the constitution in accordance with the present invention to the inline type magnetic head device, for instance, a hole or cutout may be formed in the portions or portion which is located in the lengthwise direction of the load beam and which is provided on both sides or one side of the pivot; and the flexure may be provided with the hook-shaped restricting piece so that the restricting piece is engaged with the hole or cutout formed in the load beam.

Thus, according to the present invention described in detail above, the hook-shaped restricting pieces or piece is provided, for example, on the portion of the flexure excluding the portion secured to the support member, the insert piece is provided on the support member at the position opposed to the restricting pieces or piece, and the insert piece is inserted in the restricting pieces or piece to secure the flexure to the support member, thus making it possible to restrict the vertical shift of the flexure to a predetermined range.

Hence, even if the rigidity of the flexure is decreased to make the head main body smaller, the vertical shift of the flexure caused by an impact can be restricted to a predetermined range. This enables the head main body to take a stable floating position and it also prevents the flexure from being deformed by an impact as in the prior art.

What is claimed is:

1. A magnetic head device having a support member, a flexure supported by said support member, and a head main body secured to said flexure, wherein said head main body supported by said flexure is free to swing, with a butting portion provided between itself and said support member serving as a supporting point of the swing, and a restricting portion for restricting the swing of said head main body, said butting portion serving as the supporting point of the swing, to a predetermined range is provided between said flexure and said support member; said restricting portion is provided on both sides of said butting portion;

wherein said restricting portion is comprised of a hook-shaped restricting piece which juts out from said flexure toward said support member and which has a recessed portion, and an insert piece which is provided on said support member and which is allowed to move within a predetermined area in the recessed portion of said restricting piece, wherein said hook-shaped restricting piece is formed by bending as an integral part of said flexure or said support member.

2. A magnetic head device according to claim 1, wherein the swing range of said head main body which is restricted by said restricting portion is not less than the range in which said head main body swings on a moving record medium, said butting portion serving as the supporting point.

3. A magnetic head device, having a support member, a flexure supported by said support member, and a head main body secured to said flexure, wherein said head main body supported by said flexure is free to swing, with a butting portion provided between itself and the support member serving as a supporting point of the swing, and a restricting portion for restricting the swing of said head main body, said butting portion serving as the supporting point of the swing, to a predetermined range is provided between said flexure and said support member; wherein said restricting portion is provided on both sides of said butting portion; wherein said restricting portion is comprised of a hook-shaped restricting piece which juts out from said support member toward said flexure and which has a recessed portion, and an insert piece which is provided on said flexure and which is allowed to move in a predetermined area in the recessed portion of said restricting piece wherein said hook-shaped restricting piece is formed by bending as an integral part of said flexure or said support member.

4. A magnetic head device according to claim 3, wherein the swing range of said head main body which is restricted by said restricting portion is not less than the range in which said head main body swings on a moving record medium, said butting portion serving as the supporting point of the swing.

5. A magnetic head device having a support member, a flexure supported by said support member, and a head main body secured to said flexure, wherein said head main body supported by said flexure is free to swing, with a butting portion provided between itself and said support member serving as a supporting point of the swing, and a restricting portion for restricting the swing of said head main body, said butting portion serving as the supporting point of the swing, to a predetermined range is provided between said flexure and said support member; wherein said restricting portion is comprised of a hook-shaped restricting piece which juts out from said flexure toward said support member and which has a recessed portion, and an insert piece which is provided on said support member and which is allowed to move within a predetermined area in the recessed portion of said restricting piece; wherein said hook-shaped restricting piece is formed by bending as an integral part of said flexure or said support member.

6. A magnetic head device according to claim 5, wherein the swing range of said head main body which is restricted by said restricting portion is not less than the range in which said head main body swings on a moving record medium, said butting potion serving as the supporting point.

7. A magnetic head device having a support member, a flexure supported by said support member, and a head main body secured to said flexure, wherein said head main body supported by said flexure is free to swing, with a butting portion provided between itself and said support member serving as a supporting point of the swing, and a restricting portion for restricting the swing of said head main body, said butting portion serving as the supporting point of the swing, to a predetermined range is provided between said flexure and said support member; wherein said restricting portion is comprised of a hook-shaped restricting piece which juts out from said support member toward said flexure and which has a recessed portion, and an insert piece which is provided on said flexure and which is allowed to move in a predetermined area in the recessed portion of said restricting piece; wherein said hook-shaped restricting piece is formed by bending as an integral part of said flexure or said support member.

8. A magnetic head device according to claim 7, wherein the swing range of said head main body which is restricted by said restricting portion is not less than the range in which said head main body swings on a moving record medium, said butting portion serving as the supporting point of the swing.

* * * * *